Nov. 21, 1950     A. W. OFELDT     2,530,904
CLUTCH CONTROL
Filed Sept. 16, 1944     2 Sheets-Sheet 1
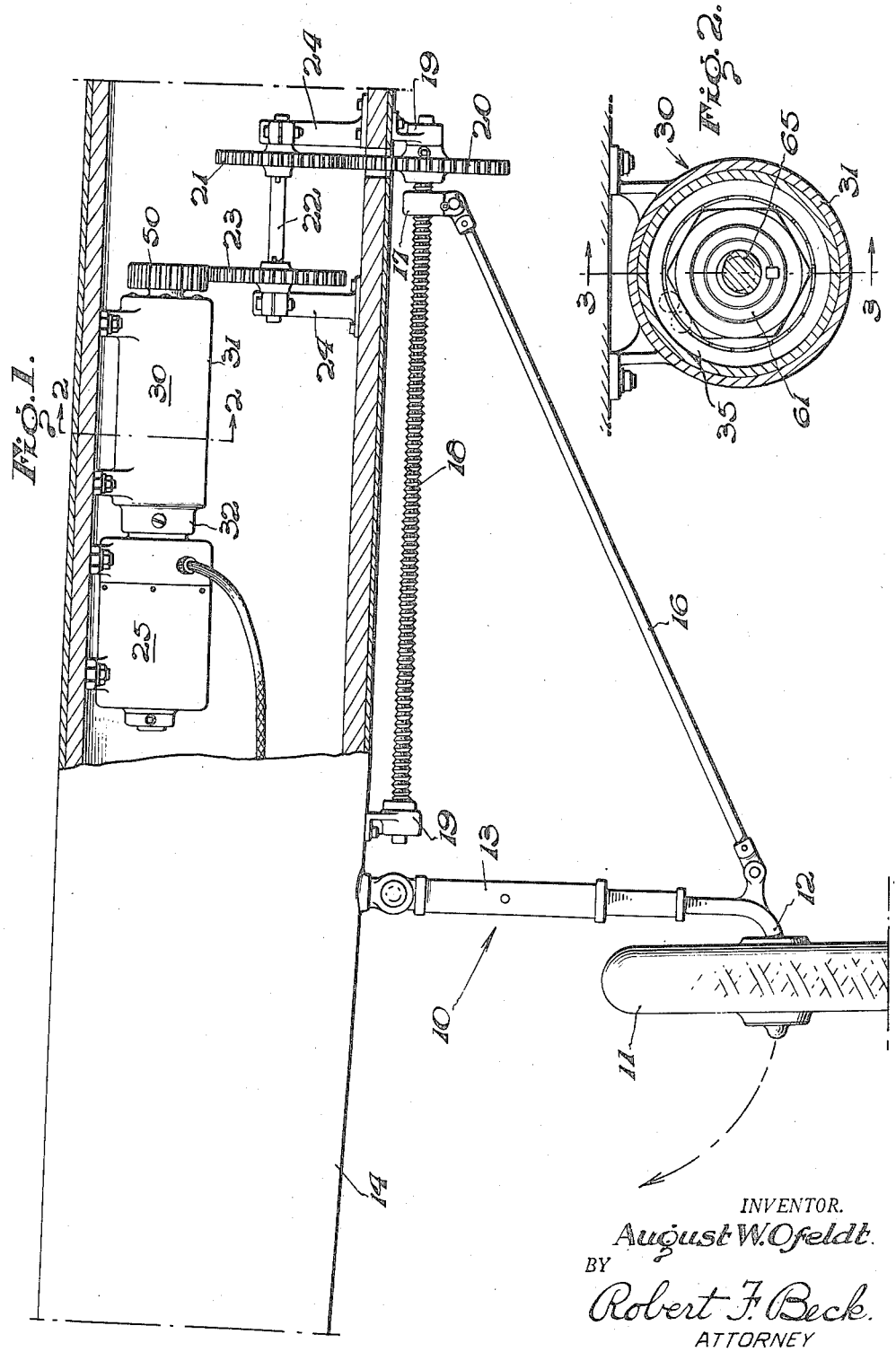
INVENTOR.
August W. Ofeldt.
BY
Robert F. Beck.
ATTORNEY Nov. 21, 1950     A. W. OFELDT     2,530,904
CLUTCH CONTROL
Filed Sept. 16, 1944     2 Sheets-Sheet 2
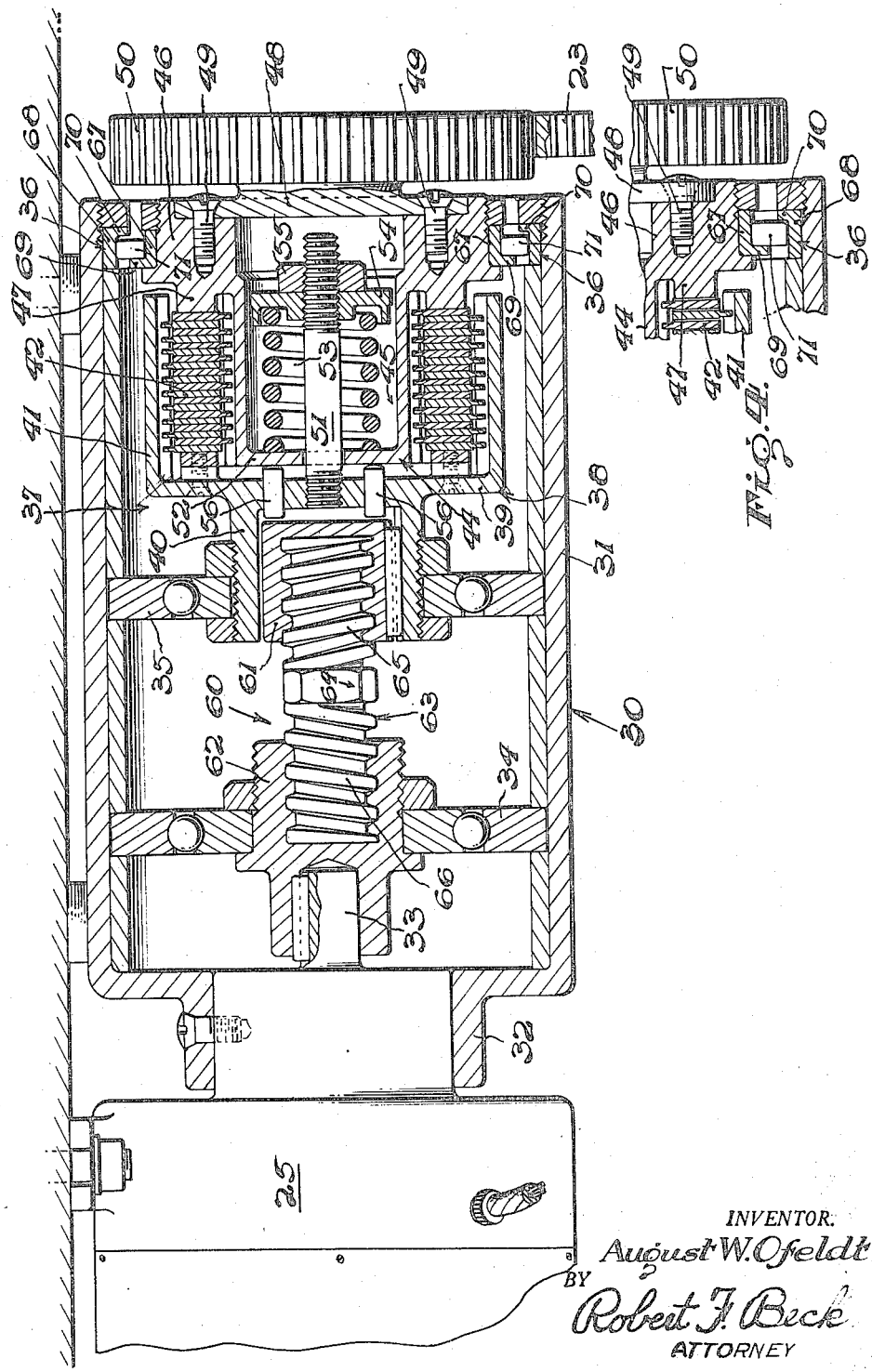
INVENTOR.
August W. Ofeldt.
BY Robert F. Beck
ATTORNEY Patented Nov. 21, 1950

2,530,904

UNITED STATES PATENT OFFICE 2,530,904

CLUTCH CONTROL

August W. Ofeldt, Hackensack, N. J., assignor to Bendix Aviation Corporation, Teterboro, N. J., a corporation of Delaware Application September 16, 1944, Serial No. 554,499

9 Claims. (Cl. 192—55)

1

My invention relates to drives and more particularly to drives of the clutch type.

One of the objects of my invention is to provide a drive of the clutch type equipped with means responsive to an overloading of the driven means for rendering the clutch ineffective and in a manner to preclude burning of the clutch.

Another object of my invention is to provide a drive of the foregoing described character which is simple in construction, durable in use, efficient in operation and economical in manufacture.

With the above and other objects in view, as will hereinafter appear, the invention consists in the combination and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views, Figure 1 is a side elevation of my invention illustrated in conjunction with a retractable landing gear of an aircraft.

Figure 2 is a sectional view taken on a line 2—2 of Figure 1.

Figure 3 is a sectional view taken on a line 3—3 of Figure 2 and on an enlarged scale.

Figure 4 is a detail sectional view of a portion of one end of the housing and illustrating the bearing for the carrier.

As illustrated in Figure 1 of the drawings, the invention is illustrated in conjunction with a retractable landing gear 10 of an aircraft and which gear includes a wheel 11 mounted on an axle 12 equipped with a shock absorber 13 pivotally connected to the wing 14 of the craft. The wheel 11 is moved from the position illustrated to a retracted position within a suitable recess (not shown) in the wing 14 by means of a strut bar 16, the latter being pivotally connected at one end to the axle 12 and at the other end to a threaded collar 17 mounted for reciprocal movement on a threaded shaft 18, the pitch of the threads of the shaft being such that the wheel 11 may be rigidly secured in any selected position. The ends of the shaft 18 are journalled in bearings 19 and with one end having mounted thereon a gear 20 for effecting rotation of the shaft and pivoting of the wheel 11 to raised or lowered positions, as the case may be. The gear 20 meshes with a drive gear 21 keyed to a jack

2 shaft 22 having fixed thereto a driven gear 23, the jack shaft being mounted within the wing 14 by means of bearings 24. A reversible electrical motor 25 is also mounted within the wing for operating the landing gear 10 in a manner hereinafter more fully described. Inasmuch as the foregoing described elements or components form no part of the present invention per se, a more detailed disclosure of the same is not believed necessary, components or an assembly of a similar type being disclosed in U. S. Patent No. 2,262,330.

A driving mechanism 30 is connected between the motor and the landing gear 10 and comprises a cylindrical housing 31 which is attached to the wing 14 and formed, at one end, with a diametrically reduced section 32 embracing a boss of the motor 25, through which the drive shaft 33 thereof extends, a set screw being employed to maintain the housing in fixed relation with respect to the motor. Internally, the housing 31 is provided with a plurality of roller bearings 34, 35 and 36 arranged in predetermined spaced relation for a purpose to be later described.

Disposed within the housing 31 is a clutch assembly 37 comprising a double cup-shaped casing 38 formed with a radial dividing wall 39 defining a pair of inner and outer chambered portions 40 and 41 respectively. The outer portion 41 is of a greater diameter than the inner portion 40 and receives therein a multiple disc clutch pack 42 formed with a central opening.

A clutch actuating unit designated generally by the numeral 44 comprises a cup-shaped portion 45 nested within the central opening of the pack 42 and an outwardly extending annular lip 46 rotatably mounted in the bearing 36. The lip 46 is provided with a shoe 47 for engaging one end of the clutch pack 42, the discs of said pack being splined to the portion 41 and the cup-shaped portion 45 in alternate relation to effect clutched and declutched relation between the cup-shaped casing 38 and the cup-shaped portion 45 of the unit 44 when the pack is compressed and released respectively by the shoe 47 as hereinafter made apparent. A plate 48 is secured to the lip 46 by means of screws 49 and encloses the outer end of the cup-shaped portion 45, said plate having fixed thereto an external driving gear 50 meshing with the gear 23 on the jack shaft 22.

The dividing wall 39 of the cup-shaped casing 38 has threaded therein the inner end of a stud or bolt 51 which extends through a central axially aligned opening in the adjacent end wall or bottom 52 of the cup-shaped portion 45 and has sleeved thereon a coil spring 53 having one end engaging the end wall 52 and the opposite end engaging an axially adjustable retaining disc or tensioning member 54 threaded on the stud and retained thereon, in adjusted position, by means of a nut lock 55 threaded on the outer end. By adjusting the member 54 relative to the stud, the tension of the spring 53 may be varied to control the pressure applied to the pack by the shoe 47. The radial wall 39 of the casing 38 is provided with a pair of slidably mounted actuating pins 56 which extend through said wall 38 and engage the wall 52 of the cup-shaped portion 45 for axially moving the latter against the tension of the spring to release the friction of the clutch pack.

A clutch actuator means generally indicated by the numeral 60 is disposed within the housing 31 and comprises a pair of axially spaced internally threaded sleeves 61 and 62 respectively, and with the latter sleeve being journalled in the bearing 35 and formed with a section keyed to the motor shaft 33 for effecting unitary rotation of the shaft and sleeve. The sleeve 61 is disposed within the chambered portion 40 which is rotatably mounted in the bearing 35 and is splined to the portion 40 for rotation therewith and axial movement relative thereto as hereinafter more clearly described.

A double acting screw member or right-and-left screw shaft 63 connects the sleeves 61 and 62 together and is formed with a tool receiving intermediate section 64 and has its reversibly threaded end sections 65 and 66 threaded within the sleeves 61 and 62 respectively for unitary axial movement in opposite directions depending upon the direction of rotation of the latter. The leads of the threads of the end sections 65 and 66 are such as to normally establish and maintain unitary rotation between the sleeves and member in conformity to a pre-established load value on the friction clutch pack, the exceeding of which value, by load imposed upon the lip 46, serves to effect axial movement of either the sleeve 61 relative to the end section 65 or axial movement of the end section 66 relative to the sleeve 62 depending upon the direction of rotation of said shaft 63 and thus moves the sleeve 61 towards the dividing wall 39 of the casing 38.

When the sleeve 61 is axially moved towards the wall 39 in the foregoing described manner, the pins 56 will also be moved and effect actuation of the clutch actuating unit 44 to quickly release the cooperating discs of the clutch pack by reason of the abrupt angular position of the threads. Such a release of the clutch pack, as thus described, permits an accelerated and appreciable axial displacement of the discs relative to each other thereby releasing their frictional engagement thus eliminating disc burning, it being understood that the tension of the spring 53 is adjusted in a manner to impose a greater load value on the pack than the load on the clutch actuator means. From the foregoing, it will be apparent that when the landing gear reaches its retracted position, an overload, in excess of the value established for the clutch actuator means, will be imposed upon the lip 46 with the result that the sleeve 61 will be actuated to effect actuation of the clutch actuating unit and thereby release the cooperating discs of the clutch pack to permit continued operation of the motor without the chances of burning the clutch discs or until such time as the motor has been cut off. When the landing gear is operated from retracted to its extended position, by reversing the direction of rotation of the motor 25, a similar overload is imposed upon the lip 46 when said gear reaches its extended position with the result that a like operation of the parts is had.

As illustrated in Figures 3 and 4, the inner and outer races 67 and 68 of the bearing 36 are provided with radially disposed end flanges 69 and 70, respectively, for embracing the rollers 71, each of the roller paths being of a greater width than the rollers to permit axial movement of the lip 46 relative to the housing 31 when the clutch operating unit 44 is actuated for releasing and compressing the clutch pack 42.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What is claimed is:

1. In combination, a housing, a reversible motor including a shaft extending into said housing, and means in said housing including an axially stationary coupling sleeve splined to said shaft for rotation therewith and having an internally screw threaded portion, a bearing rotatively supporting said sleeve, an axially movable second rotatable coupling sleeve having opposite internal screw thread, a shaft having opposite end lengths in and cooperatively threaded to said sleeves, respectively, a member including oppositely facing cup portions of different diameters having a mutual bottom wall therebetween, the cup of smaller diameter being disposed about and splined to said second sleeve for rotation therewith, a bearing cooperating with said smaller cup and rotatably supporting said member, torque limiting means including a friction disc pack in the cup of larger diameter, a third cup surrounded by said pack having a closed end wall next to said bottom wall and a shoe at the open end of the third cup axially opposite one end of said pack, discs of said pack being splined to said larger cup and said third cup, respectively, for rotation therewith and axial movement relative thereto, a bolt concentric with said discs in said third cup fixed to said closed end, a spring tensioning member around said bolt, a spring around said bolt between said closed end and said tensioning member for urging said shoe against said pack and pressing the pack at its other end against said bottom wall, a bearing for, and providing for axial movement of, said third cup, slide pin means in said bottom wall through the intermediary of which said second sleeve moves said third cup against the action of said spring to relieve the pressure of said shoe on said pack, and a driven gear outside said housing and connected to said third cup for rotation thereby.

2. In combination, a motor including a shaft, an internally screw threaded axially stationary coupling sleeve rotatable by said shaft, an axially movable and oppositely internally screw threaded second coupling sleeve, a shaft between and having opposite end lengths cooperatively threaded to said sleeves, respectively, a member including oppositely facing cup portions of different diameters having a mutual bottom wall, the smaller cup being rotatable with said second sleeve, torque limiting means including a friction disc pack in the larger cup, a third cup surrounded by said pack having a closed end next to said wall and a shoe at the open end of the third cup axially opposite one end of said pack, discs of said pack being connected to said larger cup and said third cup, respectively, for rotation therewith and axial movement relative thereto, a bolt concentric with said discs and situated in said third cup fixed to said closed end, a spring tensioning member on said bolt, a spring between said closed end and said tensioning member for urging said shoe against said pack to press the pack against said bottom wall, means slidable in said bottom wall by which said second sleeve moves said third cup against the action of said spring to relieve the pressure of said shoe on said pack, and a member rotatably driven by said third cup.

3. In combination, a driving shaft, an axially stationary screw threaded coupling element rotatable by said shaft, an axially movable oppositely threaded second coupling element, a shaft between said elements having portions cooperatively threaded thereto, respectively, a member including oppositely facing cup portions having a mutual bottom wall, one of said cups being rotatable with said second element, torque limiting means including normally frictionally engaging means in the other of said cups, a third cup surrounded by said friction means having a closed end next to said wall and a shoe at the open end of the third cup axially opposite said friction means, elements of said friction means being connected to said one and said other cup, respectively, for rotation therewith and movement relative thereto for varying the friction therebetween, spring means concentrically disposed within said discs in said third cup for urging said shoe to bias said friction elements together, means adapted for actuation by said second coupling element in response to axial movement thereof against the action of said spring means to relieve the pressure of said shoe on said friction means, and a member rotatably driven by said third cup.

4. In combination in a transmission mechanism, a reversibly rotatable driving input member, an axially stationary coupling rotatable by said member, a second rotatable coupling adapted for axial movement, a driven output member, torque limiting means including a multiplicity of friction discs operatively connected between said output member and said second coupling, means normally maintaining the torque of said limiting means at a predetermined value, spring actuating means concentrically mounted within said friction discs operable by said second coupling in response to the aforesaid axial movement of this second coupling to affect said maintaining means to reduce said value, and means cooperatively connected to and between said coupling members adapted to normally cause driving of said output member by said input member in either direction of rotation of the latter at loads under said value and responsive to the imposition on said output member of a load greater than said value for causing the aforesaid axial movement of said second coupling.

5. In combination in a transmission mechanism, a reversibly rotatable driving input member, an axially stationary coupling rotatable by said member, a second rotatable coupling adapted for axial movement, a driven output member, torque limiting means including a multiplicity of friction discs operatively connected between said output member and said second coupling, compressible means concentrically disposed within said friction discs normally maintaining the torque of said limiting means at a predetermined value and responsive to said axial movement for reducing said value, and means cooperatively connected to and between said coupling members adapted to normally cause driving of said output member by said input member in either direction of rotation of the latter at loads under said value and responsive to the imposition on said output member of a load greater than said value for causing the aforesaid axial movement of said second coupling.

6. In combination in a transmission mechanism, a reversibly rotatable driving input member, an axially stationary coupling rotatable by said member, a second rotatable coupling adapted for axial movement, a driven output member, torque limiting means including a multiplicity of friction discs operatively connected between said output member and said second coupling, normally maintaining said torque at a predetermined value and responsive to the aforesaid axial movement of said second coupling for reducing said value, and spring means concentric within said friction discs cooperatively connected to and between said coupling members adapted to normally cause driving of said output member by said input member in either direction of rotation of the latter at loads under said value and responsive to the imposition on said output member of a load greater than the aforesaid value for causing said axial movement of said second coupling.

7. In combination in a transmission mechanism, a reversibly rotatable driving input member, an axially stationary coupling rotatable by said member, a second rotatable coupling adapted for axial movement, a driven output member, torque limiting means operatively connected between said output member and said second coupling, normally maintaining said torque at a predetermined value, a control member responsive to the aforesaid axial movement of said second coupling for reducing said value, and spring means biasing said control member in opposition to the axial movement of said second coupling so as to normally cause driving of said output member by said input member in either direction of rotation of the latter at loads under said value and means including a screw having right and left hand threads responsive to the imposition on said output member of a load greater than said value for causing the aforesaid axial movement of said second coupling and adjustment of said control member to reduce said value.

8. In combination in a transmission mechanism, a reversibly rotatable driving input member, a rotatably driven output member, and connecting means between said members including torque limiting means normally maintaining the torque at a predetermined value, and load responsive means to effect said limiting means in either direction of rotation of said input member to reduce said value upon imposition on said output member of a load greater than said value, the last said means including predetermined compressible means, a screw having right and left hand screw threads, a pair of movable elements cooperating with said threads respectively, one of said elements rotatably connected to said input member, the other of said elements movable axially upon imposition of said load on said output member, a control member to affect said limiting means, and said control member biased by said compressible means in opposition to the axial movement of said one element.

9. In combination in a transmission mechanism, a reversibly rotatable driving input member, a rotatably driven output member, and connecting means between said members including torque limiting means normally maintaining the torque at a predetermined value, and load responsive means to affect said limiting means in either direction of rotation of said input member to reduce said value upon imposition on said output member of a load greater than said value, the last said means including predetermined compressible means, a reversibly rotative member, means axially oppositely affected by said member in accordance with the direction of rotation thereof, and a member affected in one direction in opposition to said compressible means to reduce said value in response to rotation of said reversibly rotative member in either direction.

AUGUST W. OFELDT.

REFERENCES CITED

The following references are of record in the file of this patent:

UNITED STATES PATENTS

| Number | Name | Date |
|---|---|---|
| 975,846 | Fensom | Nov. 15, 1910 |
| 1,071,992 | Ellett | Sept. 2, 1913 |
| 1,254,372 | Stanley | Jan. 22, 1918 |
| 1,409,090 | Slasser | Mar. 7, 1922 |
| 1,430,627 | Cleland | Oct. 3, 1922 |
| 1,636,009 | Miller | July 19, 1927 |
| 1,735,799 | Smith | Nov. 12, 1929 |
| 1,757,517 | Eaton | May 6, 1930 |
| 1,775,479 | Arter | Sept. 9, 1930 |
| 1,958,070 | Schmid et al. | May 8, 1934 |
| 1,959,042 | Staley | May 15, 1934 |
| 1,985,662 | Lansing | Dec. 25, 1934 |
| 2,241,639 | Fitzgerald | May 13, 1941 |
| 2,355,202 | Cartlidge | Aug. 8, 1944 |
| 2,371,855 | Sunderland | Mar. 20, 1945 |